Patented Nov. 17, 1936

2,061,520

UNITED STATES PATENT OFFICE 2,061,520

CYANURYL DERIVATIVES OF DITHIO-CARBAMIC ACIDS

Ludwig Orthner, Leverkusen-I. G. Werk, and Max Bögemann, Cologne-Mulheim, Germany, assignors to I. G. Farbenindustrie Aktiengesellschaft, Frankfort-on-the-Main, Germany No Drawing. Application March 10, 1932, Serial No. 598,090. In Germany March 11, 1931

7 Claims. (Cl. 260—27)

The present invention relates to a process of preparing cyanuryl derivatives of dithiocarbamic acids and to the new products obtainable by said process.

In accordance with the invention new cyanuryl derivatives of dithiocarbamates are prepared by reacting with a cyanuryl halogenide, such as cyanuryl chloride or -bromide upon a salt (alkali metal-, earth alkali metal- magnesium salt, for example) of a dithiocarbamic acid of the formula:—

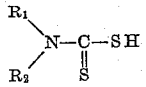

wherein $R_1$ means alkyl, aryl, aralkyl or hydroaryl, $R_2$ alkyl, aralkyl or hydroaryl or $R_1$ and $R_2$ jointly stand for a chain of alkylene groups which may be interrupted by oxygen or sulfur.

The reaction is advantageously performed while heating the reaction components in an aqueous medium or in the presence of another solvent being inert to the starting materials, such as acetone, methylalcohol, ethylalcohol etc., to a temperature between about 30–60° C., the best results being generally obtained at a temperature of about 40–50° C. Advantageously, at least three molecular proportions of the dithiocarbamate should be applied on one molecular proportion of the cyanuryl halogenide.

When working in this manner compounds are obtained which probably correspond to the general formula:—

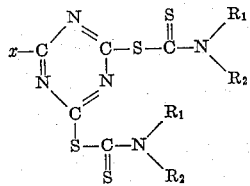

wherein $R_1$ means an alkyl-, phenyl-, benzyl- or hydrophenyl radical, $R_2$ an alkyl-, benzyl- or hydrophenyl radical or $R_1$ and $R_2$ jointly stand for a pentamethylene chain in which the central methylene group may be replaced by O or S and $x$ stands for one of the groupings

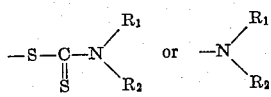

wherein $R_1$ and $R_2$ have the above meaning.

The question, whether the one or the other type of reaction products is formed is dependent on the dithio-carbamate applied. This may be explained as follows:—When one chlorine atom in a cyanuryl halogenide has been replaced, the remaining two halogen atoms react less readily. Now, on causing, for example, cyanuryl chloride to react with salts of a disubstituted dithiocarbamic acid, the latter partly dissociates into the base, from which the dithiocarbamic acid is derived, carbon disulfide and, for example, sodium hydroxide. When the base thus formed is comparatively strong, it reacts with the reactive chlorine atom mentioned, whereas the two other chlorine atoms are replaced by the residue of the dithiocarbamic acid. There are therefore formed compounds, in which $x$ stands for

On the other hand, when the base from which the dithiocarbamic acid is derived is a comparatively weak base, the reactive chlorine atom does not react with the free base formed by dissociation, but the three chlorine atoms react with the salt of the dithiocarbamic acid with the formation of compounds, in which $x$ stands for

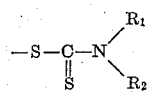

According to our investigations compounds of the latter type are generally formed in case dithiocarbamates are applied, in which $R_1$ means aryl, aralkyl or hydroaryl, and $R_2$ alkyl, aralkyl or hydroaryl, whereas the compounds of the other type are generally formed when dithiocarbamates, in which $R_1$ and $R_2$ mean alkyl or jointly stand for a chain of alkylene groups, which may be interrupted by oxygen or sulfur, are used. It may be pointed out, however, that in some cases also compounds of both types may be formed simultaneously, and that the mixtures of compounds thus obtainable are intended to be included in our invention.

The new compounds generally form yellow crystals, soluble in the usual organic solvents with a yellow coloration. They are distinguished by their property to strongly accelerate the vulcanization of natural rubber or artificial rubber-like masses as are obtainable, for example, by polymerizing butadiene hydrocarbons, (butadiene, isoprene, 2.3-dimethyl-butadiene etc.), chlorobutadiene etc. alone or in admixture with other polymerizable compounds, such as styrene, acrylic acid derivatives, unsaturated ketones etc.

The following examples illustrate the invention, without, however, restricting it thereto:—

Example 1

To 94 parts by weight of the sodium salt of dimethyl-dithiocarbamic acid, 900 parts by weight of acetone are added. On heating the mixture a solution results. To this solution, whilst stirring, a solution of 40 parts by weight of cyanuryl chloride in 300 parts by weight of acetone is added. Subsequently, the solution is heated during two hours to 50° C. After cooling, the precipitated sodium chloride is filtered off and the yellow solution is concentrated in vacuo. The residue is crystallized from dioxane. Yellow crystals M. P. 182° C. are obtained. The probable formula is:—

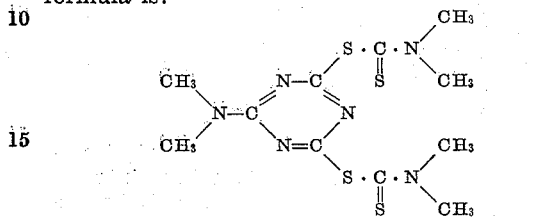

*Example 2*

When replacing in Example 1 the sodium-dimethyl-dithiocarbamate by the equivalent quantity of penta-methylene-dithiocarbamic acid (in the form of its sodium salt), a reaction product is obtained, crystallizing from dioxane in yellow crystals of the melting point 199–200° C. The product most probably corresponds to the formula:—

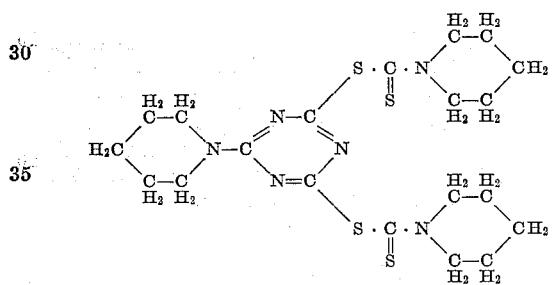

When replacing in this example the sodium-pentamethylene dithiocarbamic acid by tetra-methylene-dithiocarbamic acid, the corresponding cyanuryl derivative is likewise obtained in form of yellow crystals.

*Example 3*

83 parts by weight of sodium-cyclohexylethyl-dithiocarbamate are dissolved in 400 parts by weight of acetone at 40° C. A solution of 23 parts of cyanuryl chloride in 250 parts by weight of acetone is caused to run in and the reaction mixture is heated to 50° C. for three hours. After cooling, the reaction product having separated is filtered by suction, washed with water and crystallized from a mixture of dioxane and ethylalcohol. The new compound is thus obtained in form of yellow crystals melting at 153° C. It probably corresponds to the formula:—

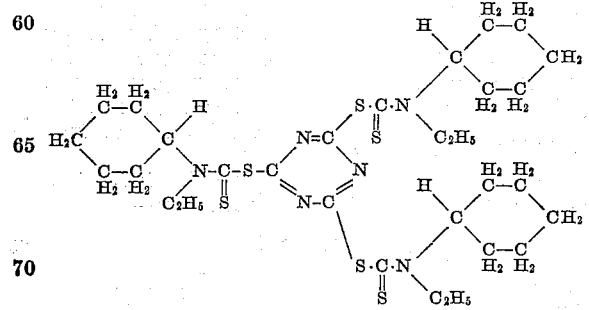

*Example 4*

112 parts by weight of sodium phenylmethyl dithiocarbamate are mixed with 1500 parts by weight of acetone. To this mixture a solution of 35 parts by weight of cyanuryl chloride in 500 parts by weight of acetone is added in the cold. After two hours, the reaction mixture is slowly heated to 50° C. and kept at this temperature for three hours. After cooling the reaction mixture is filtered, the filtrate evaporated in vacuo and the smeary residue treated with a mixture of acetone and methylalcohol, whereby it solidifies. The product thus obtained crystallizes from a mixture of acetone and methylalcohol in form of yellow crystals, melting at 131° C. It probably corresponds to the formula:

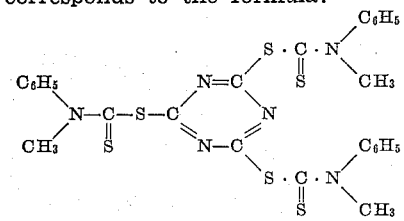

In the above examples the starting materials may be replaced by alkali metal-, earth alkali metal- or other salts of the dithiocarbamic acid derived from:—diethylamine, dipropylamine, dibutylamine, diisobutylamine, methyl-ethylamine, dicyclohexylamine, cyclohexyl-methylamine, tolylmethylamines, xylyl-ethylamines, ethylphenylethylamines, dibenzylamine, benzylmethylamine, morpholine, thiomorpholine etc., whereby the corresponding cyanuryl derivatives are likewise formed.

For vulcanization purposes the compounds above described are incorporated within rubber according to any desired method, for example, by rolling or kneading. Furthermore, a vulcanizing agent, such as sulfur, selenium, organic nitro compounds with metal oxides, and, if desired, filling materials (zinc oxide, carbon black etc.) softening agents, antiperishing agents etc. are added. The mixture is then vulcanized by heating the same, for example, to a temperature between about 110–150° C. The following example is intended to illustrate the method, how our new compounds may be applied for vulcanization purposes. The example likewise shows the good critical temperature of the new vulcanization accelerators.

With a test mixture of the composition:—

| | Parts by weight |
|---|---|
| Light crepe | 100 |
| Zinc oxide | 5.0 |
| Sulfur | 2.5 |
| Stearic acid | 1.0 |
| Accelerator | 0.35 | the following figures were obtained, using the product of the reaction of cyanuryl chloride with the sodium salts of dimethyl-dithiocarbamic acid (A), of pentamethylene-dithiocarbamic acid (B), and of methylphenyl-dithiocarbamic acid (C) in comparison with the piperidine salt of pentamethylene-dithiocarbamic acid (D):—

| Time of heating | Tearing strength in kg./cm.² percentage extension | | | |
|---|---|---|---|---|
| | A | B | C | D |
| 20 minutes under ½ atmosphere excess pressure. | Under vulcanized | Under vulcanized | Under vulcanized | 201 kgs. 790% |
| 30 minutes under 2 atmospheres excess pressure. | 212 kgs. 870% | 205 kgs. 825% | 154 kgs. 896% | 178 kgs. 710% |

Instead of the accelerators mentioned in this example, the other cyanuryl derivatives described before may be applied with a similar effect.

Similar results are obtained when artificial rubber-like masses are used, such as those obtainable by the polymerization of butadiene-(1.3) or homologues or analogues thereof.

We claim:—

1. The process which comprises heating a cyanuryl halogenide with a salt of a compound of the formula:—

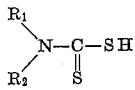

wherein $R_1$ means an alkyl-, phenyl-, benzyl- or hydrophenyl radicle, $R_2$ an alkyl- benzyl- or hydrophenyl radicle, or $R_1$ and $R_2$ jointly stand for a pentamethylene chain in which the central methylene group may be replaced by O or S, to a temperature between about 30–60° C. in the presence of a solvent being inert to the starting materials, the salt of the dithiocarbamic acid being soluble in said solvent.

2. The process which comprises heating one molecular proportion of cyanuryl chloride with at least three molecular proportions of an alkali metal salt of a compound corresponding to the general formula:—

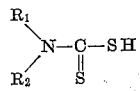

wherein $R_1$ means an alkyl-, phenyl-, benzyl- or hydrophenyl radicle, $R_2$ an alkyl-, benzyl- or hydrophenyl radicle or $R_1$ and $R_2$ jointly stand for a pentamethylene chain, in which the central methylene group may be replaced by O or S, to a temperature between about 40–50° C. in the presence of a solvent being inert to the starting materials.

3. The process which comprises heating a cyanuryl halogenide with a salt of a compound of the formula:—

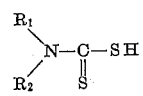

wherein $R_1$ means an alkyl-, phenyl-, benzyl- or hydrophenyl radicle, $R_2$ an alkyl-, benzyl- or hydrophenyl radicle, or $R_1$ and $R_2$ jointly stand for a pentamethylene chain, in which the central methylene group may be replaced by O or S, to a temperature between about 30 and 60° C. in the presence of ethyl alcohol.

4. The compounds of the general formula

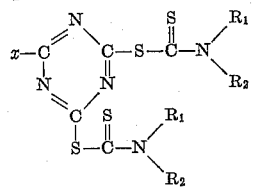

wherein $R_1$ means an alkyl-, phenyl-, benzyl- or hydrophenyl radical, $R_2$ an alkyl-, benzyl- or hydrophenyl radical or $R_1$ and $R_2$ jointly stand for a pentamethylene chain in which the central methylene group may be replaced by O or S, and $x$ stands for one of the groupings

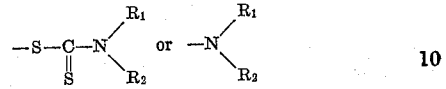

wherein $R_1$ and $R_2$ have the above meaning, said compounds forming yellow crystals soluble in the usual organic solvents with a yellow coloration and being valuable vulcanization accelerators.

5. The product of the formula:—

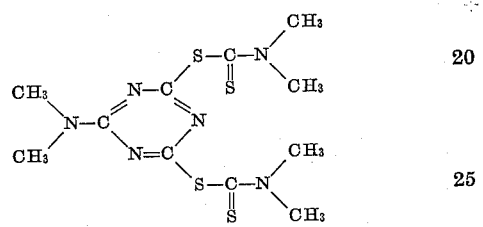

said product forming yellow crystals melting at 182° C.

6. The product of the formula:—

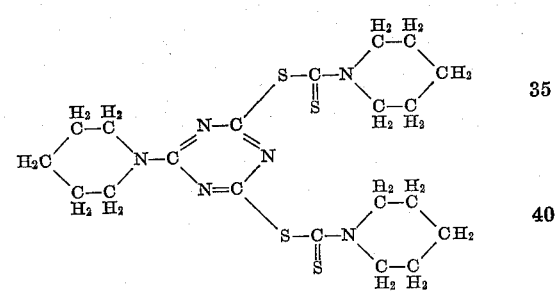

said product forming yellow crystals melting at 199–200° C.

7. The product of the formula:—

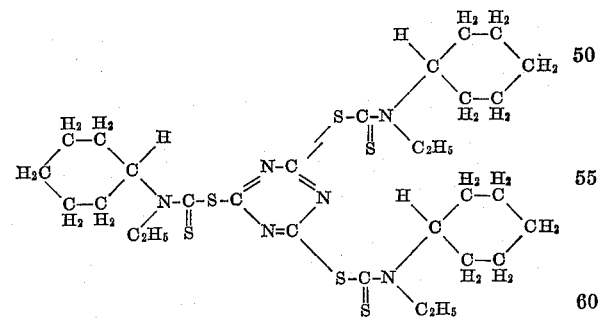

said product forming yellow crystals melting at 131° C.

LUDWIG ORTHNER.
MAX BÖGEMANN.